(12) United States Patent
Costantino

(10) Patent No.: US 8,954,222 B2
(45) Date of Patent: Feb. 10, 2015

(54) METHOD AND SYSTEM FOR RETRIEVING DIAGNOSTIC INFORMATION

(71) Applicant: David Costantino, San Diego, CA (US)

(72) Inventor: David Costantino, San Diego, CA (US)

(73) Assignee: Mitchell Repair Information Company, LLC, Poway, CA (US)

( * ) Notice: Subject to any disclaimer, the term of this patent is extended or adjusted under 35 U.S.C. 154(b) by 0 days.

(21) Appl. No.: 13/656,699

(22) Filed: Oct. 20, 2012

(65) Prior Publication Data

US 2013/0054082 A1   Feb. 28, 2013

Related U.S. Application Data

(63) Continuation of application No. 12/327,170, filed on Dec. 3, 2008, now Pat. No. 8,315,760.

(51) Int. Cl.
*G01M 17/00* (2006.01)
*G05B 23/02* (2006.01)

(52) U.S. Cl.
CPC .................. *G05B 23/0272* (2013.01)
USPC .......... 701/32.1; 701/29.1; 701/29.3

(58) Field of Classification Search
USPC ........... 701/29.1, 29.3, 29.7, 29.6, 31.8, 31.4, 701/31.5, 31.6, 32.1, 33.2, 34.4, 33.3, 34.2; 702/183
See application file for complete search history.

(56) References Cited

U.S. PATENT DOCUMENTS

| | | |
|---|---|---|
| 5,541,840 A | 7/1996 | Gurne et al. |
| 5,758,300 A | 5/1998 | Abe |
| 5,916,286 A | 6/1999 | Seashore et al. |
| 6,542,799 B2 | 4/2003 | Mizutani et al. |
| 6,560,516 B1 | 5/2003 | Baird et al. |
| 6,615,120 B1 | 9/2003 | Rother |
| 6,714,846 B2 | 3/2004 | Trsar et al. |
| 6,898,605 B2 * | 5/2005 | Constantino ............. 726/9 |
| 6,941,203 B2 | 9/2005 | Chen |
| 6,947,816 B2 | 9/2005 | Chen |
| 7,209,860 B2 | 4/2007 | Trsar et al. |
| 7,272,475 B2 * | 9/2007 | Gawlik et al. ......... 701/31.5 |
| 7,319,848 B2 | 1/2008 | Obradovich et al. |
| 7,444,216 B2 | 10/2008 | Rogers et al. |
| 8,315,760 B2 * | 11/2012 | Costantino ............. 701/32.1 |
| 2002/0007237 A1 | 1/2002 | Phung et al. |
| 2003/0167111 A1 | 9/2003 | Kipersztok et al. |
| 2005/0137762 A1 | 6/2005 | Rother |
| 2005/0171661 A1 | 8/2005 | Abdel-Malek et al. |
| 2006/0085108 A1 | 4/2006 | Grief et al. |
| 2006/0095230 A1 | 5/2006 | Grief et al. |
| 2008/0004764 A1 | 1/2008 | Chinnadurai et al. |
| 2009/0216401 A1 | 8/2009 | Underdal et al. |
| 2009/0271066 A1 | 10/2009 | Underdal et al. |
| 2009/0271239 A1 | 10/2009 | Underdal et al. |
| 2010/0138701 A1 | 6/2010 | Costantino |

* cited by examiner

*Primary Examiner* — Patrick Hawn

(74) *Attorney, Agent, or Firm* — McDonnell Boehnen Hulbert & Berghoff LLP

(57) ABSTRACT

A system, method, and apparatus for retrieving trouble codes from a motor vehicle and retrieving only relevant diagnostic information relative to the returned codes from one or more remote diagnostic libraries. An electronic diagnostic library contains generalized diagnostic vehicle information tagged with trouble code identification ID's at a first location, and a diagnostic tool at a second location requests only relevant diagnostic information from the electronic library that is tagged with trouble code identification ID's corresponding to the retrieved trouble codes. The diagnostic tool receives the specific diagnostic vehicle information at the first location and may store the specific vehicle information locally prior to displaying an index to the information to a repair technician.

24 Claims, 13 Drawing Sheets

⟨engine⟩ ⟨article-id: id=A00175279⟩ ⟨eng-perf⟩ ⟨eng-perf-fault-isolation⟩
⟨doc-head⟩ ENGINE PERFORMANCE ⟨doc-head⟩
⟨doc-subhead⟩ Detroit Diesel - DDEC III/IV Single ECM - Troubleshooting ⟨doc-subhead⟩

⟨info-obj: id=S106548818220050041900000⟩
⟨title⟩ FAULT CODE 33 - TBS HIGH ⟨title⟩
⟨figure⟩
⟨graphic: graphicname=G02487850 id=S036429819920050042000000 gwidth=1col⟩

212
210

FIG. 3 info-obj: id=S02829091362005042000000 content.type=description.and.or.operation

⟨title⟩ Description

⟨para⟩ ⟨ptxt⟩ Fault Code 33 denotes engine Turbo Boost Sensor (TBS), see intxref: refid=S03642981992005042000000 dest=fig ⟨intxref⟩ Fig. 75 and intxref: refid=S12652602292005042000000 dest=fig ⟨intxref⟩ Fig. 76, input to ECM has exceeded 95% (normally more than 4.75 volts) of sensor supply voltage. ⟨ptxt⟩ ⟨para⟩

⟨para⟩ ⟨ptxt⟩ Code is usually caused by:

FIG. 4

SPECIFICATIONS

| Application | Specification |
|---|---|
| Electrical Specifications | |
| Coolant Temperature Sensor Supply Voltage | Greater Than 4.75 Volts |
| Sealant Specifications | |
| Coolant Temperature Sensor | Loctite Pipe Sealant W/Teflon (PT-7260) Or Equivalent |
| Torque Specifications | |
| Coolant Temperature Sensor | 75-94 Ft. Lbs. (102-127 N.m) |

1104 — Electrical Specifications
1106 — Sealant Specifications
1108 — Torque Specifications

FIG. 14

METHOD AND SYSTEM FOR RETRIEVING DIAGNOSTIC INFORMATION

CROSS REFERENCE TO RELATED APPLICATION

This application is a continuation application of U.S. Pat. No. 12/327,170, filed Dec. 3, 2008. U.S. patent application Ser. No. 12/327,170 published as U.S. Patent Application Publication No. 2010-0138701 A1. U.S. patent application Ser. No. 12/327,170 and U.S. Patent Application Publication No. 2010-0138701 A1 are incorporated herein by reference for all purposes.

BACKGROUND

1. Field of the Application

This application relates generally to test and diagnostic systems for motor vehicles. More particularly, the application relates to an automated process for retrieving diagnostic vehicle information relative to returned trouble codes from one or more vehicle components under diagnosis. While the application is described in the context of a vehicle diagnostic system and method, the principles of the present application are equally applicable for any testing and diagnostic systems, including non-motor vehicle equipment, as long as the equipment under diagnosis stores trouble codes relative to an error condition.

2. Description of the Related Art

Motor vehicles are becoming highly computerized products. In recent years, the control of internal combustion engines has branched away from traditional mechanical linkages and analog approaches to electronic or microprocessor-based control systems. In a typical modern motor vehicle, the operation of the combustion engine is controlled by an engine control module (ECM) which receives a variety of input signals and outputs signals for monitoring and controlling various components of the engine. For example, the ECM can send signals to a fuel system for controlling the air/fuel mix sent to the engine cylinders. The ECM may also receive and store signals from various sensors throughout the engine and drive train. For example, the sensors may provide signals indicative of engine speed, fuel/air mix, intake and exhaust pressure, engine operating temperatures, fluid levels, and the like.

The ECM may retain a portion of this data in memory, providing a history of engine performance, operating parameters, and error indicators. An external interface to the ECM and its stored data is provided at a location accessible to a repair technician. The information stored in the ECM can be downloaded via the external interface at predetermined intervals in the engine life, when there are noticeable degradations in engine performance, or when critical trouble codes are received and externally indicated to an operator of the motor vehicle. The downloaded information can then be analyzed by a repair technician to evaluate the engine performance or error conditions, and thereby make informed recommendations for servicing of the engine.

In order to facilitate the retrieval of trouble codes and diagnostic information from an ECM or similar circuit, a number of different types of trouble code retrieval tools have been developed to assist in the diagnosis and repair of fault conditions reported by the ECM's. Such a retrieval tool can typically be connected to the ECM's external interface and provides a display for reporting the data stored in the ECM. For example, a retrieval tool may obtain one or more pieces of information about the vehicle's engine noted above, including fluid levels, operating temperatures, fuel/air mixes, in addition to other information reported by the transmission, air conditioning, braking, and/or power systems.

Once the trouble codes are retrieved, the codes can be entered into a diagnostic tool that utilizes the trouble code information to form diagnostic trees, which are created by Original Equipment Manufacturers (OEMs). Diagnostic tools may allow a repair technician to enter information, including fault symptoms, into the diagnostic tool to be used in conjunction with the information downloaded from the vehicle's on-board computer to diagnose and assist in the repair of fault conditions in the vehicle.

Manufacturers publish repair manuals, including diagnostic trees, exploded part diagrams, and the like, to aid in the diagnosis and repair of problems discovered by such diagnostic tools. For example, based upon selected faults, a diagnostic tree could present the reader with a list of tests to be performed to diagnose the cause or causes of the faults. The tests can be listed in the order in which they would most likely be effective in diagnosing the vehicle faults, based upon a manufacturer's information and previous repair and diagnosis experience with this type of vehicle, for example. The repair manuals may be available in hard copy or accessible via the Internet in a computer viewable format.

In practice, a repair technician then sorts through the repair information in order to find the information pertinent to the specific equipment being diagnosed. Though technicians see this as part of their job, it can be a time consuming process. The time element increases a cost of repair and delays the turn-around time for returning the motor vehicle under repair to service. This is especially important in the trucking industry, where a truck must be on the road to be generating income, or where a disabled truck is carrying a time-sensitive load such as perishable food.

SUMMARY

In light of the above, a method for quickly and automatically retrieving only relevant diagnostic vehicle information corresponding to retrieved trouble codes from an ECM is desirable.

System Aspects

According to the present application, a system for retrieving specific diagnostic vehicle information comprises: (i) a first computing system at a first location, the first computing system including an electronic library of diagnostic information tagged with trouble code identification ID's stored in a first electronic medium, and (ii) a second computing system at a second location, the second computing system including a first interface for retrieving diagnostic trouble codes from a second electronic storage medium within an equipment under diagnosis, the second computing system also having a second interface for connecting with the first computing system and having a display for providing information to a user of the second computing system. The second computing system is configured to, upon retrieval of the diagnostic trouble codes, request specific diagnostic information from the electronic library at the first location tagged with the trouble code identification ID's corresponding to the trouble codes received from the equipment under diagnosis, store the specific diagnostic information, and populate the display to the user with an index to the retrieved specific diagnostic information.

In another aspect, the specific diagnostic information includes at least one selected from the group consisting of wiring diagrams, images of equipment components, suggested diagnostic testing steps, equipment component removal and installation instructions, and component specification data.

In another aspect, the electronic library and the second computing device are connected to the Internet, and the second computing system requests the specific diagnostic information from the electronic library at the first location via the Internet.

In another aspect, the second computing device also retrieves year, make, and model information or unique equipment identification number (EIN) information from the second electronic storage medium within the equipment under diagnosis, and sends the year, make, and model information or EIN information along with the retrieved trouble codes to the electronic library at the first location.

In another aspect, the equipment under diagnosis is a motor vehicle or a portion of a motor vehicle, and the electronic library of tagged diagnostic information is motor vehicle diagnostic information.

Computing Device Aspects

In another aspect, a computing device for retrieving and storing only specific diagnostic information comprises: a computing device at a first location having a first electronic storage medium, the computing system including a first interface for retrieving diagnostic trouble codes from a second electronic storage medium within an equipment under diagnosis, and having a second interface for connecting with a remote computing system at a second location via a network connection, the computing device including a display for providing information to a user of the second computing system. The computing system is configured to, upon retrieval of the diagnostic trouble codes from the equipment under diagnosis, request only specific diagnostic information from an electronic library at the first location that is tagged with trouble code identification ID's corresponding to the trouble codes received from the equipment under diagnosis, store the specific diagnostic information in the first electronic storage medium, and populate the display to the user with an index to the retrieved specific diagnostic information.

In another aspect, the specific diagnostic information includes at least one selected from the group consisting of wiring diagrams, images of equipment components, suggested diagnostic testing steps, equipment component removal and installation instructions, and component specification data.

In another aspect, the computing device and the remote computing system are connected to the Internet, and the computing device at the first location requests the specific diagnostic information from the electronic library at the second location via the Internet.

In another aspect, the computing device also retrieves year, make, and model information or unique equipment identification number (EIN) information from the second electronic storage medium within the equipment under diagnosis, and sends the year, make, and model information or EIN information along with the retrieved trouble codes to the electronic library at the second location.

In another aspect, the equipment under diagnosis is a motor vehicle or a portion of a motor vehicle, and the electronic library of tagged diagnostic information is motor vehicle diagnostic information.

Computer Program Product Aspects

In another aspect, a computer program product, comprising a computer readable medium having a computer readable program code embodied therein, said computer readable program code adapted to be executed to implement a method for retrieving specific diagnostic information, said method comprising: (i) retrieving one or more diagnostic trouble codes from an equipment under diagnosis, (ii) requesting only specific diagnostic information corresponding to the trouble codes received from the first electronic storage medium from a remote electronic library containing a library of diagnostic information tagged with trouble code identification ID's, (iii) receiving only the specific diagnostic information from the remote electronic library, (iv) storing the specific diagnostic information in a local data store, and (v) populating a display to a user with an index to the retrieved specific diagnostic information.

In another aspect, the specific diagnostic information includes at least one selected from the group consisting of wiring diagrams, images of equipment components, suggested diagnostic testing steps, equipment component removal and installation instructions, and component specification data.

In another aspect, the computing program product also retrieves year, make, and model information or unique equipment identification number (EIN) information from the first electronic storage medium within the equipment under diagnosis, and sends the year, make, and model information or EIN information along with the retrieved trouble codes to the remote electronic library.

Additional Aspects

According to the present application, a method, system, and apparatus for quickly and automatically retrieving relevant diagnostic repair content is provided. The method, system, and apparatus includes receiving trouble codes from a motor vehicle under diagnosis, retrieving identification information such as make, model, and year or a Vehicle Identification Number (VIN) of the motor vehicle under diagnosis, generating and sending a request for diagnostic information to a remote computer containing a database of article and repair information, receiving only relevant diagnostic information (including text and/or images) for evaluating, repairing, or replacing the malfunctioning equipment associated with the trouble codes, and displaying an index to the received data to a repair technician for use in evaluating, repairing, or replacing the malfunctioning equipment.

In another aspect, the method, system, and apparatus includes storing an electronic library of diagnostic and repair information tagged with article and repair information identification codes in order to allow for the retrieval of only the diagnostic information relevant to the particular trouble codes received, including receiving a request for diagnostic information relevant to one or more trouble codes and a particular make, model, and year or VIN of equipment under diagnosis, cross-referencing the trouble codes and make, model, and year or VIN to identify only the repair information identification codes relevant to the received trouble code, and responding to the request with only the repair information relevant to repairing the fault associated with the trouble codes.

In still another aspect, the method, system, and apparatus includes receiving trouble codes from a motor vehicle under diagnosis at a first location, retrieving identification information such as make, model, and year or VIN of the motor vehicle or equipment under diagnosis, generating and sending a request for diagnostic information to a remote computer containing a database of repair information, receiving the request for diagnostic information at a second remote computing location, cross-referencing the trouble codes and make, model and year or VIN to identify repair information identification codes relevant to the received trouble code, responding to the request with only the repair information relevant to repairing a fault associated with the trouble codes, receiving only the relevant repair information associated with the trouble codes at the first location, and displaying an index to the received data to a repair technician at the first location for use in evaluating, repairing, or replacing the malfunctioning equipment.

As a result of the forgoing, all relevant diagnostic and repair information corresponding to received trouble codes from equipment under diagnosis can be retrieved in a short period of time and displayed in index form for use by a repair technician. By providing tagged repair information data at the diagnostic information portal side, a diagnostic tool can retrieve all relevant repair information quickly and at one time, caching the information locally and allowing for a quicker diagnosis and repair of the vehicle under test. As a result, repair stations can become more efficient, potentially increasing turn-around times and increasing profits for both the repair technician and the owner of the vehicle under test. Additionally, in the event the server-side diagnosis information database becomes unavailable, a locally cached copy of the repair information can prevent the loss of further downtime in repairing the vehicle under test because of the lack of access to the remote diagnostic repair information. Finally, by tagging diagnostic repair information based on possible trouble codes received and stored in a vehicle under test, a processing load on the diagnostic repair information database will be substantially decreased, as only relevant information is provided to the diagnostic tool, and non-relevant data is not provided to the diagnostic tool.

These as well as other features, advantages and alternatives will become apparent to those of ordinary skill in the art by reading the following detailed description, with appropriate reference to the accompanying drawings.

BRIEF DESCRIPTION OF FIGURES

FIG. 2 is a portion of tagged repair data illustrating an Article ID tag for a particular example engine that can be utilized by the system of FIG. 1.

FIG. 3 is a portion of tagged repair data illustrating an Information ID tag for a particular trouble code for a particular example engine that can be utilized by the system of FIG. 1.

FIG. 4 is a portion of tagged repair data illustrating a Description ID tag for a particular trouble code for a particular example engine that can be utilized by the system of FIG. 1.

FIG. 14 is an example of a display of Specifications tagged diagnosis information displayed to a repair technician.

DETAILED DESCRIPTION OF EXEMPLARY EMBODIMENTS

I. Overview of the Diagnostic System Architecture

Figure 1:
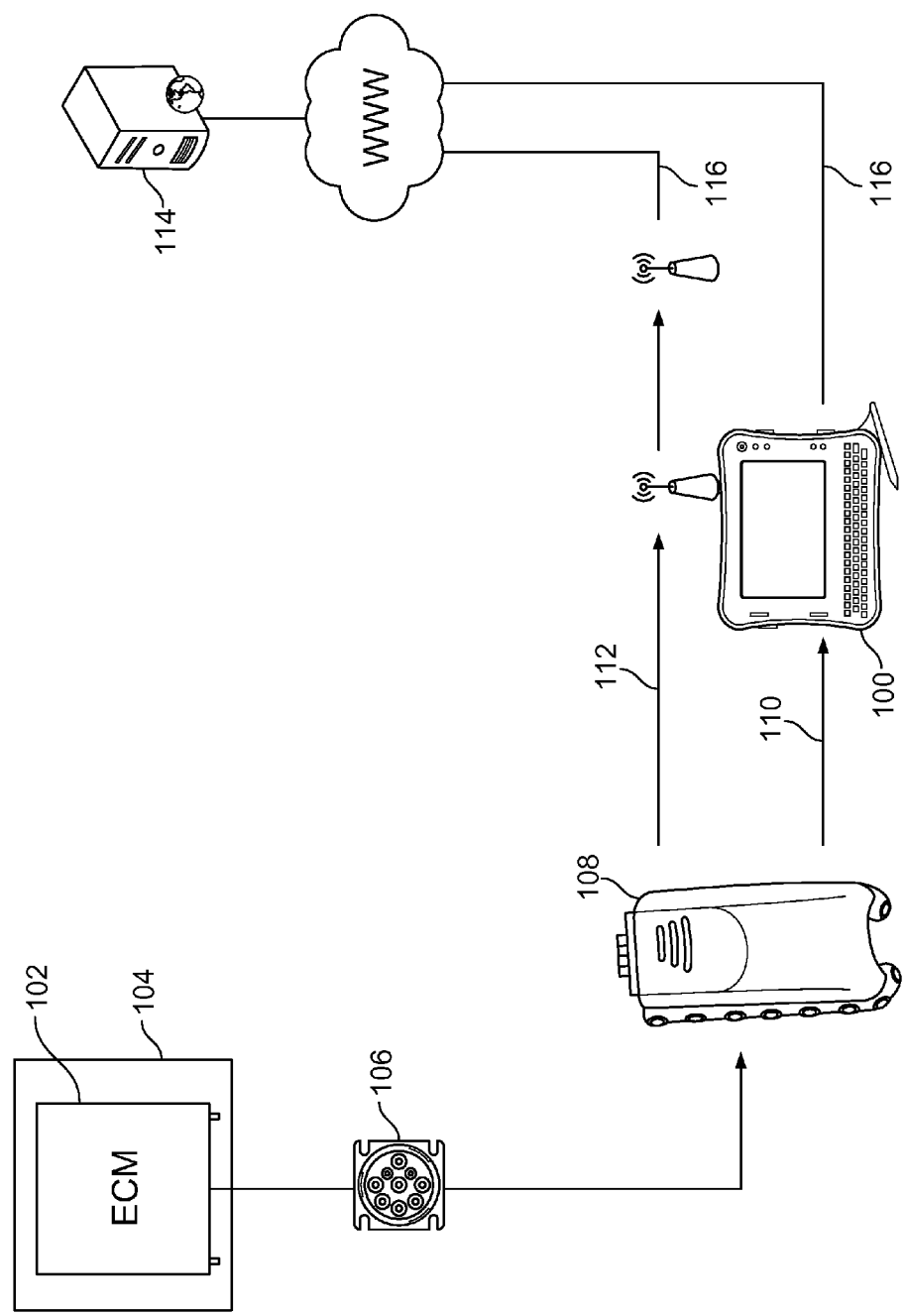
FIG. 1 is a block diagram illustrating a high-level view of the trouble code module (ECM), diagnostic tool, and diagnostic information portal for providing relevant diagnostic information to the diagnostic tool.

FIG. 1 is a block diagram of an exemplary system using a diagnostic information portal to provide only relevant diagnostic information to a requesting diagnostic tool. As illustrated, a diagnostic tool 100 interfaces with an Engine Control Module (ECM) 102 contained within a vehicle 104 via a vehicle interface port 106 and PC-to-vehicle interface 108. Although an ECM is a standardized control module and is illustrated in FIG. 1, any type of electronic error reporting and storage device could be used. The motor vehicle 104 may be a passenger car, a light duty truck, a tractor-trailer truck, or any other type of motor vehicle or general electro-mechanical system. As set forth in FIG. 1, the diagnostic tool 100 may communicate with the PC-to-vehicle interface device 108 through a wired connection 110 or a wireless connection 112.

The PC-to-vehicle interface device 108 is a standard interface device well known in the industry for providing standardized access to vehicle ECM modules across a multitude of different protocols. For example, the Nexiq® USB-Link (Product No. 125032) may be used to provide an interface between the diagnostic tool 100 and the vehicle ECM device 102.

The diagnostic tool 100 interfaces with the vehicle 104 to collect diagnostic information about the vehicle 104. The diagnostic tool 100 may interface with one or more systems within the vehicle 104 to obtain diagnostic information about those systems. For example, the diagnostic tool 100 might obtain information about the vehicle's engine, transmission system, electrical systems, air conditioning system, braking system, power steering system or any other systems. The diagnostic tool 100 might interface directly with these various systems, or the diagnostic tool 100 might interface with other diagnostic equipment (not shown), which in turn interfaces with various systems or components in the vehicle 104. Other configurations are also possible.

Depending on the motor vehicle 104 and the particular configuration of the diagnostic tool 100 or other equipment, the diagnostic tool 100 may obtain stored trouble code information about the various systems in the vehicle 104 automatically upon being connected to the vehicle 104 or upon an appropriate prompt to a repair technician utilizing the diagnostic tool 100. An automated process advantageously allows a repair technician to quickly and efficiently obtain diagnostic information about various systems in the vehicle 104.

The repair technician might also manually direct the diagnostic tool 100, via the Engine Control Module, to perform various tests on the vehicle 104 or to acquire certain other diagnostic information about the vehicle 104. This might be in addition to or in place of the previously described automated diagnostic information collection methods. Thus, the diagnostic tool 100 might automatically collect predetermined data, might collect additional data as directed by the repair technician, or might perform a combination of these methods to acquire the diagnostic information.

The trouble code(s) provided by the Engine Control Module are normally very limited, but may provide a short description of an error flag, such as "128-175-2: Oil Temperature erratic." A repair technician working on a complex engine would likely not be able to formulate a diagnosis or repair plan without substantial further exploration and test of the engine under diagnosis, even in light of the received trouble code(s).

Once the diagnostic tool 100 acquires at least the trouble code information from the vehicle 104, plus any additional information if any, the diagnostic tool 100 may then formulate a request to a diagnostic information portal 114. The diagnostic information portal 114 can provide a centralized location for repair technicians to obtain possible causes of problems with their motor vehicles, obtain diagrammed testing steps, specifications, and illustrated repair and removal instructions. The diagnostic information portal 114 can be located at the repair technician's worksite or may be located at a more remote location and might then be accessed via a wide area network or via the Internet. In either case, the diagnostic information portal 114 is likely to be accessed simultaneously by more than one repair technician. Thus the diagnostic information portal 114 might communicate with multiple diagnostic tools 100, although FIG. 1 illustrates only a single such device.

While FIG. 1 illustrates only a single diagnostic information portal 114, a diagnostic system might include more than one diagnostic information portal 114. Each diagnostic information portal 114 in the system might communicate one or more pieces of information relative to the retrieved trouble codes, or may simply perform a load balancing function between the servers. Thus, it should be understood that the configurations described herein are merely exemplary in nature, and many alternative configurations might also be used.

The diagnostic tool 100 communicates with the diagnostic information portal 114 over a communication link 116. The communication link 116 may be a wired link or a wireless link, or a combination thereof. A wireless communication link 116 can use a variety of different wireless protocols, such as the protocols under the Institute of Electrical and Electronics Engineers ("IEEE") 802.11 umbrella, IEEE 802.16, IEEE 802.20, Bluetooth, code division multiple access ("CDMA"), frequency division multiple access ("FDMA"), time division multiple access ("TDMA"), Global System for Mobile Communications/General Packet Radio Service ("GSM/GPRS"), infrared, or others. Furthermore, the data may be accessible via the internet using one or more network protocols supported by a TCP network, including but not limited to: HTTP, FTP, or SSH.

In formulating a request, the diagnostic tool 100 might include the diagnostic information received from the vehicle 104. Alternatively, the diagnostic tool 100 might only include part of the diagnostic information received from the vehicle 104, such as those trouble codes most directly related to the problem or modification. The request will also include information about the make, model, year, the VIN, or any other uniquely identifying information for the vehicle 104. The request might also include information entered by the repair technician.

The diagnostic information portal 114 receives the request from the diagnostic tool 100. In response, the diagnostic information portal 114 uses the diagnostic information in the request to search its database of diagnostic information to determine what relevant diagnostic information should be provided in response to the request. The diagnostic information database in the portal 114 will include tagged electronic diagnostic documents such as those set forth in FIGS. 2-4. After only relevant repair data is located, the diagnostic information portal 114 will respond to the request with the relevant repair data (including text and/or images). Upon receipt, the diagnostic tool 100 can display an index into the relevant repair data via a display.

II. Exemplary Diagnostic Information Portal Architecture

The diagnostic information portal 114 may be a mainframe computer, a blade server, a desktop machine, or any other computing system capable of responding to network requests and storing a database of diagnostic information. The portal 114 preferably includes random access memory for holding program code and data, a processor for processing program instructions, and a permanent data store for storing a diagnostic information database. The database may be comprised of tagged text that is searchable and graphic images and set forth repair and diagnostic information usable by a repair technician.

FIG. 2 shows the beginning of an example of a tagged diagnostic repair article for a "Detroit Diesel—DDEC III/IV Single ECM" engine 200. The tagging set forth in FIG. 2 and in FIGS. 3 and 4 is based on the Standard Generalize Markup Language (SGML). SGML is an ISO 8879:1986 standard metalanguage in which one can define markup languages for documents. Although FIGS. 2-4 utilize SGML, any document markup language could be utilized, including, for example, HTML or XML.

As shown in FIG. 2, an SGML document is tagged with an Article ID that identifies a document describing all trouble codes associated with a particular engine. The Article ID given to the document in FIG. 2 is set forth in an "article-id" tag with the value of "A00175279" 202. All trouble codes related to the Detroit Diesel-DDEC III/IV Single ECM engine 200 will be set forth in this document stored on the diagnostic information portal 114. FIG. 3 sets forth another portion of the article-id "A00175279" 202 that begins to disclose information related to "Trouble code 33" 210 on a Detroit Diesel—DDEC III/IV Single ECM" engine 200. The portion of the article ID "A00175279" 202 setting forth diagnosis information relative to "Trouble code 33" 210 is given its own information object ID, here "S10654881822005041900000" 212. As set forth in FIG. 3, the trouble code 33 means that the Turbo Boost Sensor (TBS) is too high. FIG. 4 sets forth another portion of the article ID "A00175279" 202 including a detailed description 220 of Fault Code 33, cross-references to other graphics and text for describing the fault, and finally begins to set forth the most common causes of Fault Code 33. The detailed description 220 of Fault Code 33 is given a unique information object ID of "S02829091362005042000000" 222.

By organizing diagnostic repair documents in a database by equipment types and fault codes, and tagging the information with unique Article and Object ID's, the diagnostic information portal 114 can respond to a request by the diagnostic tool 100 with only those portions of the repair information that are relevant to the specific trouble codes provided by the diagnostic tool 100 in a quick and efficient manner. Furthermore, the format of the information provided to the diagnostic tool 100 allows the tool to locally store the information. The diagnostic tool 100 can in turn display the diagnostic and repair information in a logical manner to a repair technician. Ultimately, this may aid the repair technician in more quickly diagnosing and fixing the problem with the vehicle 104 represented by the trouble codes retrieved from the ECM 102.

III. Exemplary Diagnostic Tool Architecture

The diagnostic tool 100 may be various types of devices used by a repair technician. For example, the diagnostic tool 100 may comprise a personal digital assistant (PDA) or other handheld device. Alternatively, the diagnostic tool 100 may comprise a desktop computer, a laptop computer or some other type of diagnostic equipment. One example of a diagnostic tool includes a vehicle analyzer system, such as the engine analyzer system disclosed in U.S. Pat. No. 5,250,935, which is herein incorporated in its entirety by reference, as if fully set forth in this description. As set forth in FIG. 1, the diagnostic tool 100 may communicate with the PC-to-vehicle interface 108 through a wired connection 110 or a wireless connection 112, and may communicate with the diagnostic information portal 114 via a wired or wireless connection 116. The operation of the diagnostic tool may be effected by a software or firmware code stored in a non-volatile data store and executed via a general purpose processor transformed by the software or firmware code into a specific purpose processor, or may be effected solely by a hardware structure, or a combination of the two.

IV. Exemplary Operation of the Relevant Diagnostic Information Retrieval Method

Figure 5:
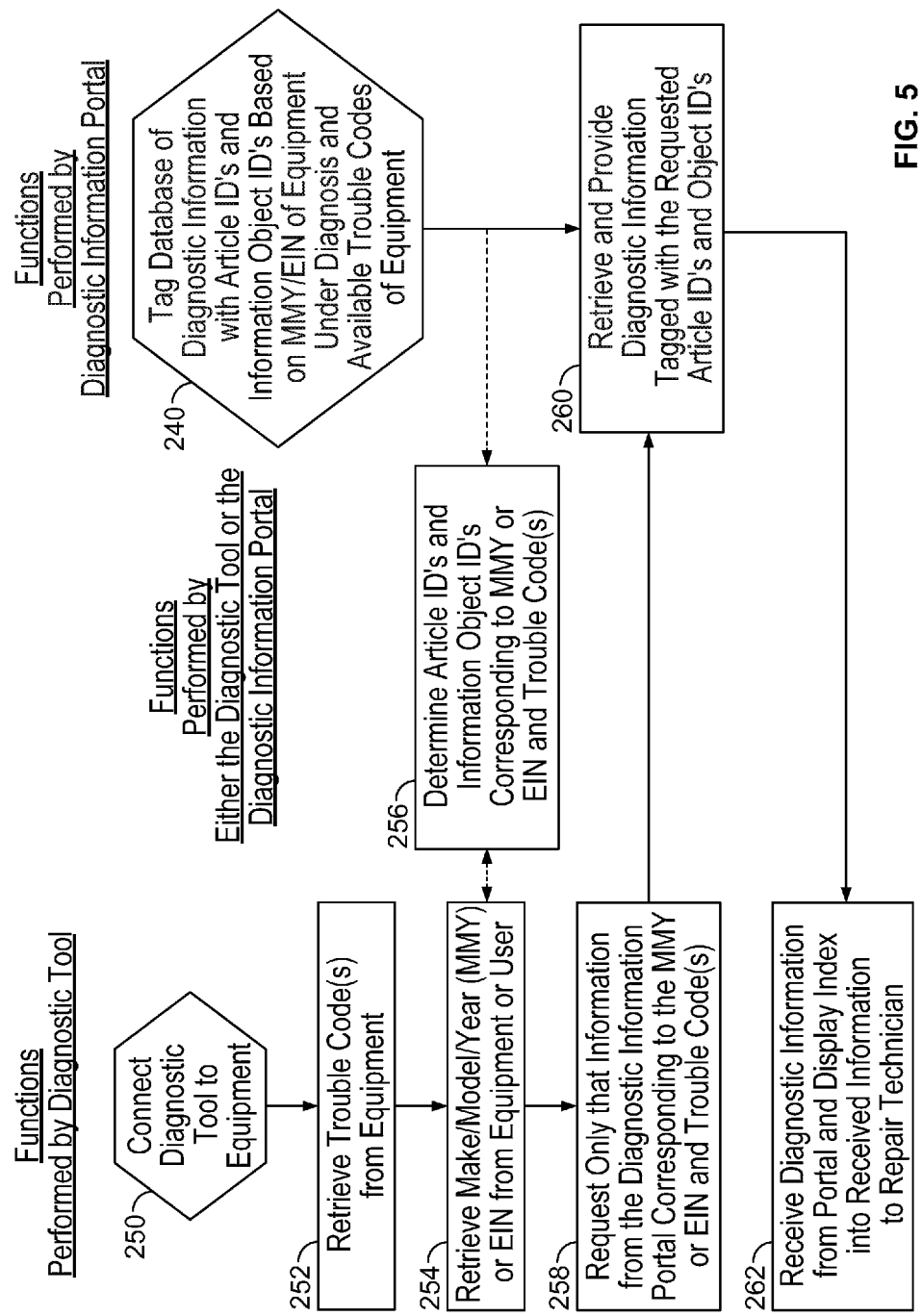
FIG. 5 is a flow-chart showing one example of operation of the system of FIG. 1.

FIG. 5 sets forth one example of the operation of the diagnostic tool 100 while the tool is connected to an ECM 102 contained within a vehicle 104. In step 240, the diagnostic information portal 114 tags a database of diagnostic information with Article ID's and Information Object ID's based on a make/model/year or VIN and trouble codes of a plurality of different equipment, such as engines. The step 240 need only be executed once, or may be executed upon any addition of new documents to the database or upon an update to documents already in the database. In step 250, the diagnostic tool is connected to a motor vehicle 104 by a repair technician. In step 252, the diagnostic tool either automatically or manually, upon the action of the repair technician, retrieves trouble code(s) from the motor vehicle 104. The tool 100 then retrieves a make/model/year (MMY) or VIN information from the vehicle, or requests entry of the same information by the repair technician in step 254. The tool 100 may then generate Article ID's and Information Object ID's relative to the trouble code(s) and MMY or VIN in step 256 if it is capable of doing so. Alternately, the generation of Article ID's and Information Object ID's may be accomplished by the diagnostic information portal in a later step.

In step 258, the diagnostic tool 100 requests only that information from the diagnostic information portal 114 that corresponds to the trouble codes and MMY or VIN. The content of the request may include the MMY, VIN, and/or trouble codes retrieved in steps 252 and 254, or may include the Article ID's and Information Object ID's generated in step 256. In step 260, the diagnostic information portal 114 receives the request from the diagnostic tool 100, and if necessary, generates Article ID's and Information Object ID's in step 256, and sends only the specific diagnostic information corresponding to the MMY or VIN and trouble code(s) to the diagnostic tool 100. In step 262, the diagnostic tool 100 receives the specific diagnostic information from the diagnostic information portal and displays an index into the data to the repair technician. Each of these steps will be explained in more detail below, as an exemplary execution of a diagnostic tool display is illustrated.

Figure 6:
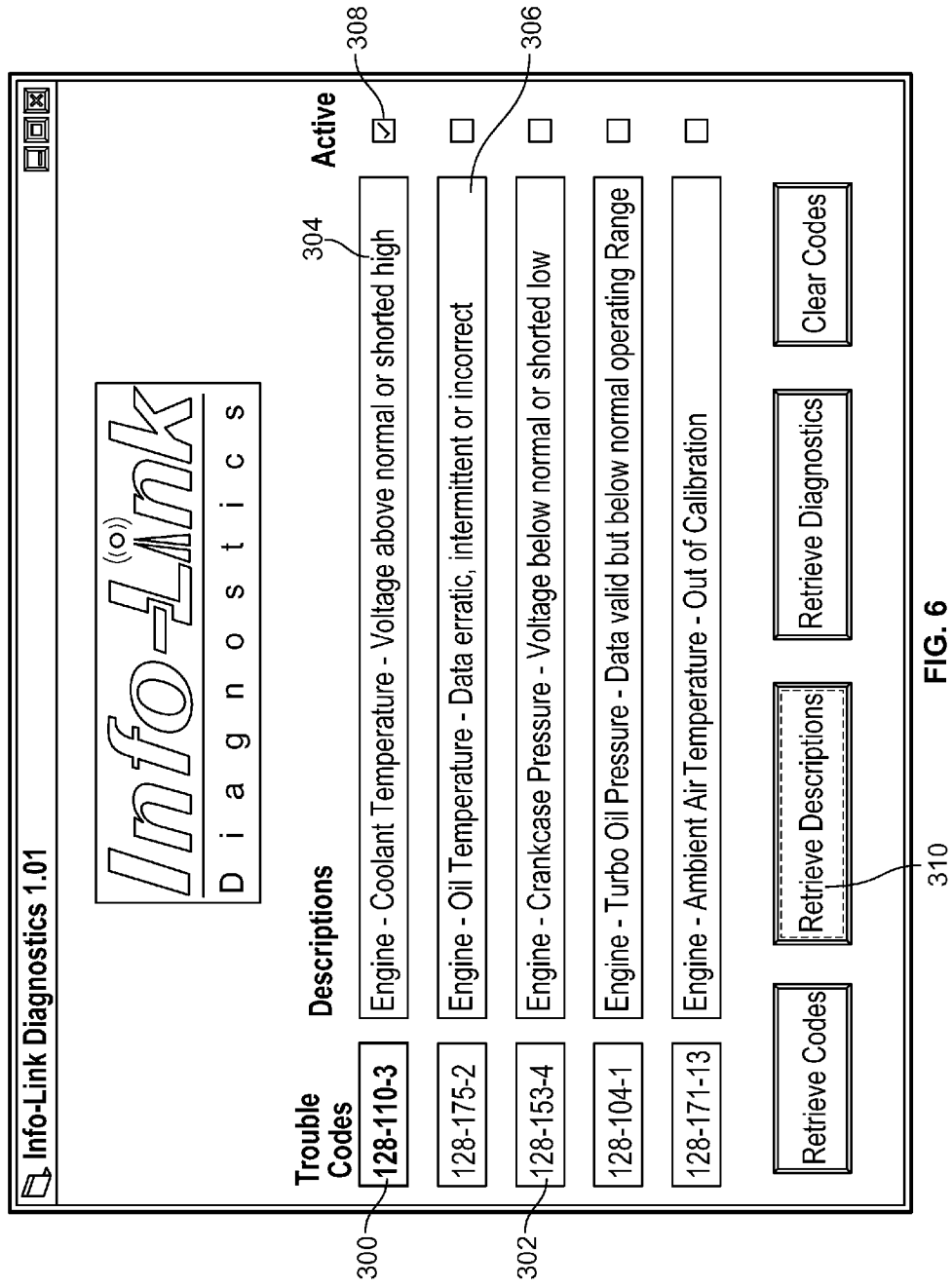
FIG. 6 is an example of a display screen on a diagnostic tool prior to retrieving diagnostic repair information.

FIG. 6 sets forth an example of an initial display of a diagnostic tool 100 upon power up. As shown, the diagnostic tool 100 can retrieve the trouble codes 300 from the ECM 102 and populate the trouble code fields 302 with the trouble codes 300 for display to the repair technician. The diagnostic tool 100 can also display short summaries 304 of the meaning of the trouble codes 300, if available. These short summaries 304 may be decoded from the ECM or stored in the diagnostic tool 100. If no short summary is available, the descriptions box 306 for that trouble code may be left blank.

Once all of the trouble codes 300 are retrieved, the repair technician may utilize checkboxes 308 to 'activate' a trouble code and diagnose the underlying problem. The repair technician may check one or more checkboxes 308 to diagnose multiple problems at once, or may diagnose one problem at a time. After determining which trouble codes 300 to diagnose, the repair technician may click on the retrieve descriptions button 310 to cause the diagnostic tool 100 to send a request for diagnostic information from the diagnostic information portal 114. As noted above, the data included in the request may include one or more trouble codes 300, one or more make/model/year or VIN information regarding the motor vehicle or equipment under repair, and optionally any additional information provided by the repair technician.

The diagnostic tool 100 or the diagnostic information portal 114 may execute a cross-reference process in which trouble codes 300 and make/model/year or VIN information is transformed into Article ID's and Information Object ID's that contain diagnosis and repair information related to the provided trouble codes 300 prior to sending the request to the diagnostic information portal 114. If the conversion process is executed at the diagnostic tool 100, then only the Article ID's and Information Object ID's are provided to the diagnostic information portal 114. If the conversion process is executed at the diagnostic information portal 114, the trouble codes 300 and make/model/year or VIN information must be sent in the request to the diagnostic information portal 114.

After conversion of the request to Article ID's and Information Object ID's, the diagnostic repair information portal 114 searches its database to retrieve only the diagnostic information necessary for repairing the malfunctioning portions of the equipment indicated by the trouble codes 300. This information is then sent back to the diagnostic tool 100, which either stores the information locally, displays it to the repair technician, or both.

Figure 7:
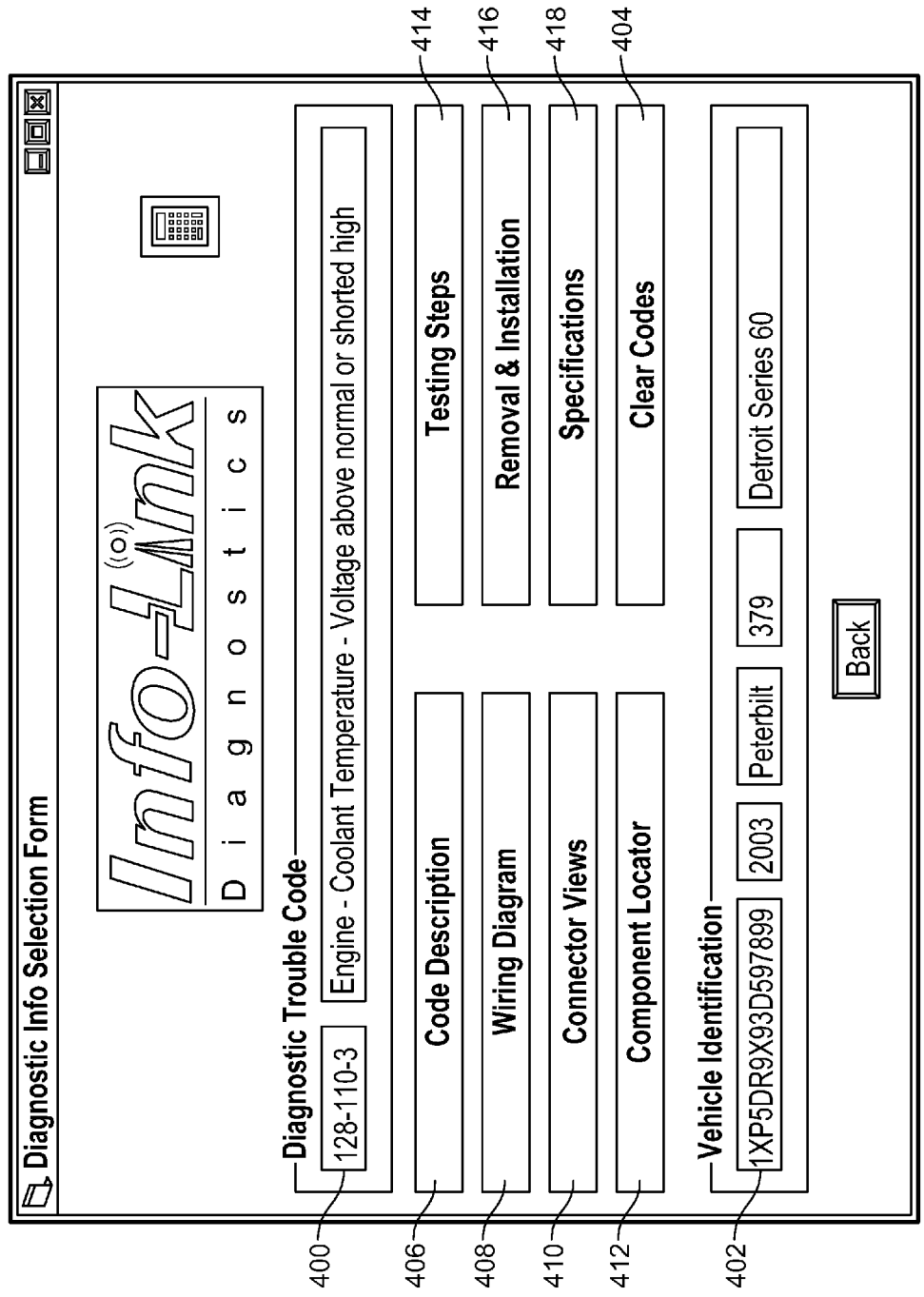
FIG. 7 is an example of an index into received diagnostic repair information displayed after the diagnostic tool retrieves diagnosis information from the diagnosis information portal.

FIG. 7 sets forth an exemplary index display on the diagnostic tool 100 of diagnostic information retrieved from the diagnostic information portal 114. The trouble code 300 utilized in the current search is set forth in the trouble code Summary Box 400. At the bottom of the window, a Part Summary Box 402 of the make, model, year, vehicle identification number (VIN), or any other information provided regarding the equipment under diagnosis is set forth.

The remaining buttons, with the exception of the "Clear Codes" button 404, provide for expanded display of diagnostic information retrieved from the diagnostic information portal 114. The Code Description button 406 displays an expanded description of the trouble code 300 set forth in the trouble code Summary Box 400, including the most likely cause(s) of the trouble code 300. The Wiring Diagram button 408 displays graphical wiring diagrams (if any) related to the trouble code 300 set forth in the trouble code Summary Box 400. The Connector Views button 410 displays graphical views of Connectors (if any) related to the trouble code 300 set forth in the trouble code Summary Box 400. The Component Locator button 412 displays graphical views of the area around where a component is located to aid the repair technician in finding the component and repairing or replacing it. The Testing Steps button 414 displays a number of steps to take in diagnosing the trouble code 300 set forth in the trouble code Summary Box 400. The Removal & Installation button 416 displays a number of steps to take to remove and/or replace a component in diagnosing the trouble code 300 set forth in the trouble code Summary Box 400. The Specifications button 418 displays specifications (such as temperature limits, pressure limits, etc.) of parts involved in the diagnosis and repair of parts related to the trouble code 300 set forth in the trouble code Summary Box 400. The Clear Codes button 404 mentioned above removes all of the information from the trouble code Summary Box 400 and the Part Summary Box 402, and requires that the repair technician begin a new search with a new trouble code 300.

Figure 8:
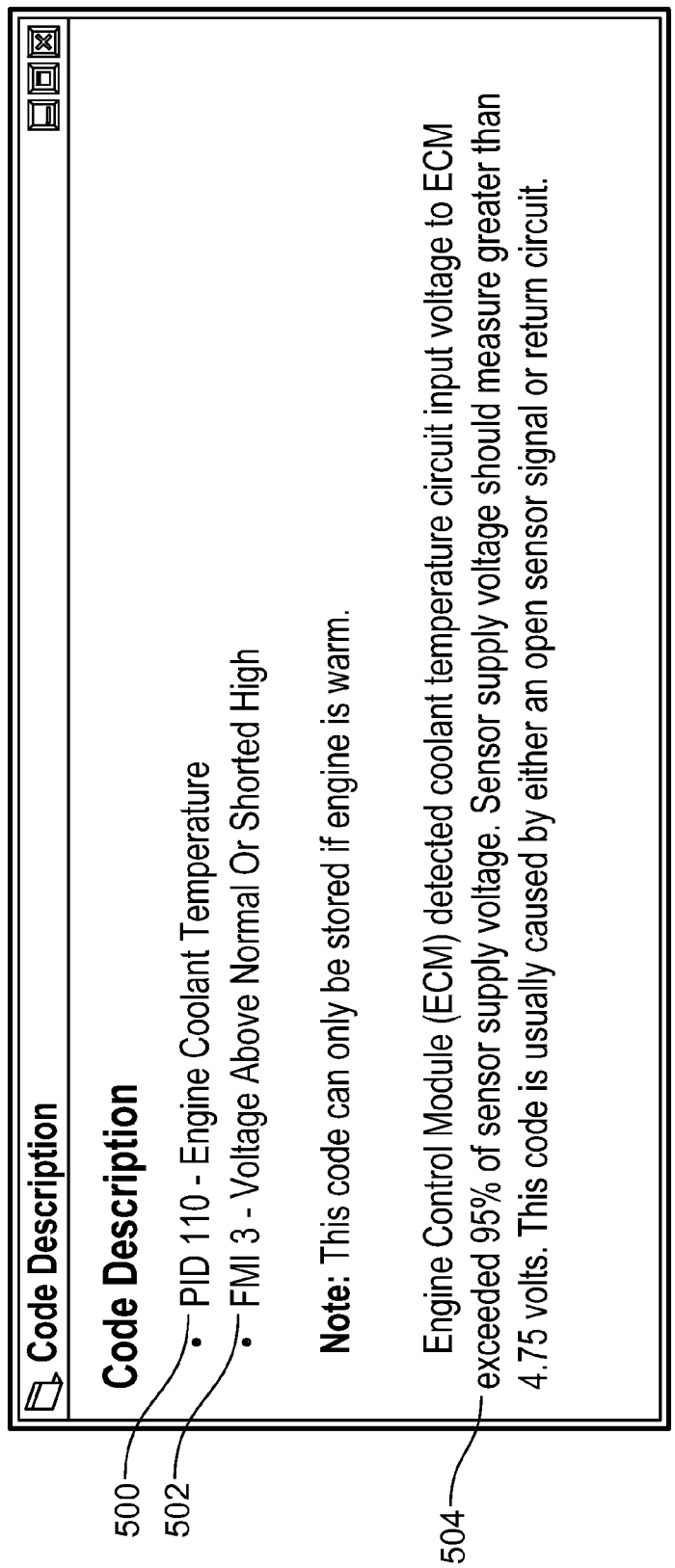
FIG. 8 is an example of a display of Code Description tagged diagnosis information displayed to a repair technician.

An example of a display of a Code Description is set forth in FIG. 8. As shown in this figure, the description at the tope of the display sets forth the particular parameter identifier (PID) 500 and failure mode identifier (FMI) 502. The Code Description box also includes an expanded summary 504 of the meaning of the trouble code 300.

Figure 9:
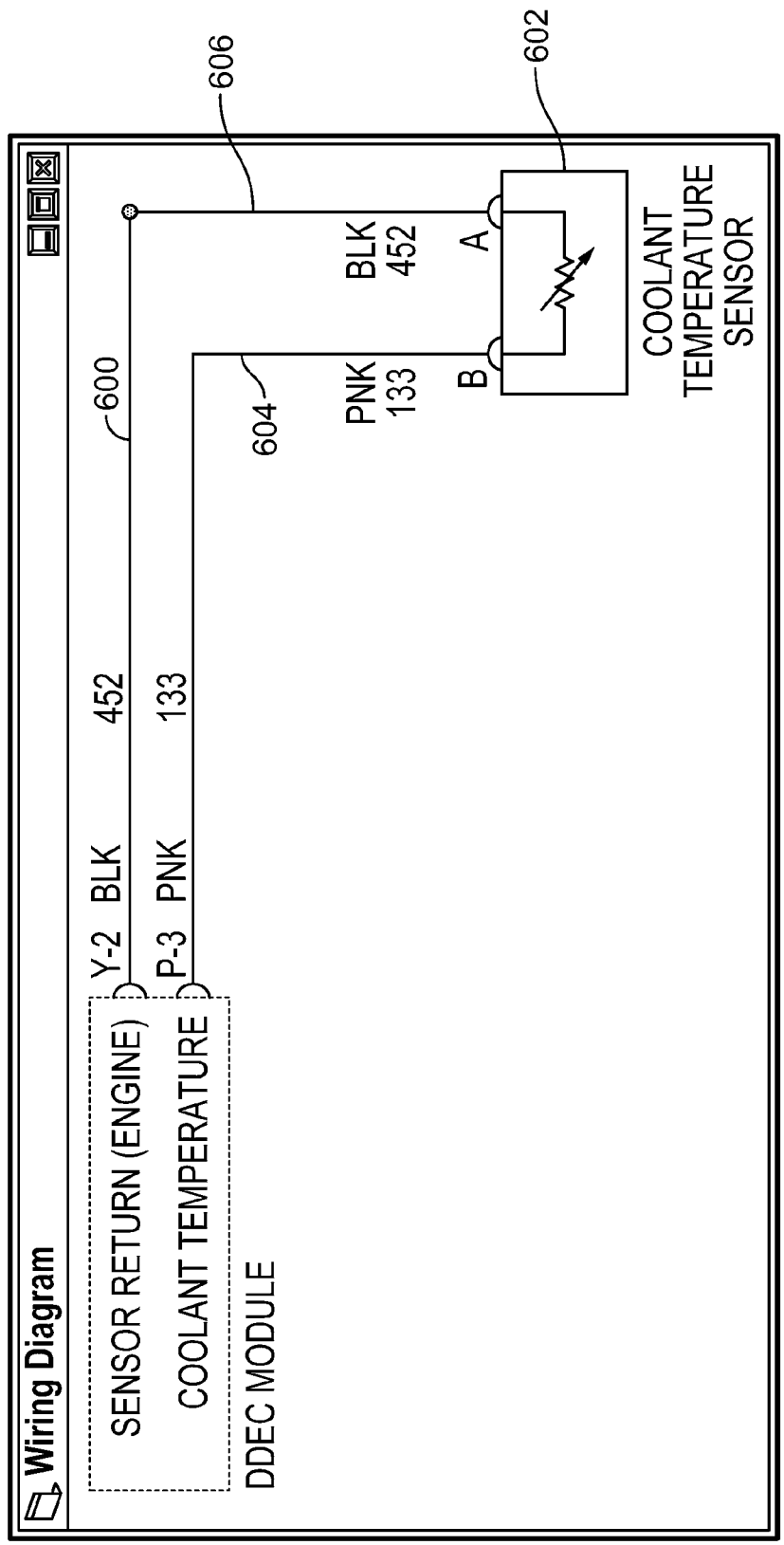
FIG. 9 is an example of a display of Wiring Diagram tagged diagnosis information displayed to a repair technician.

An example of a display of a Wiring Diagram is set forth in FIG. 9. As shown in this figure, the image sets forth a wiring layout 600 for the component under test (here, a coolant temperature sensor 602). The Wiring Diagram display also sets forth colors for each of the wires connecting the component 602 (here, a pink wire 604 and a black wire 606).

Figure 10:
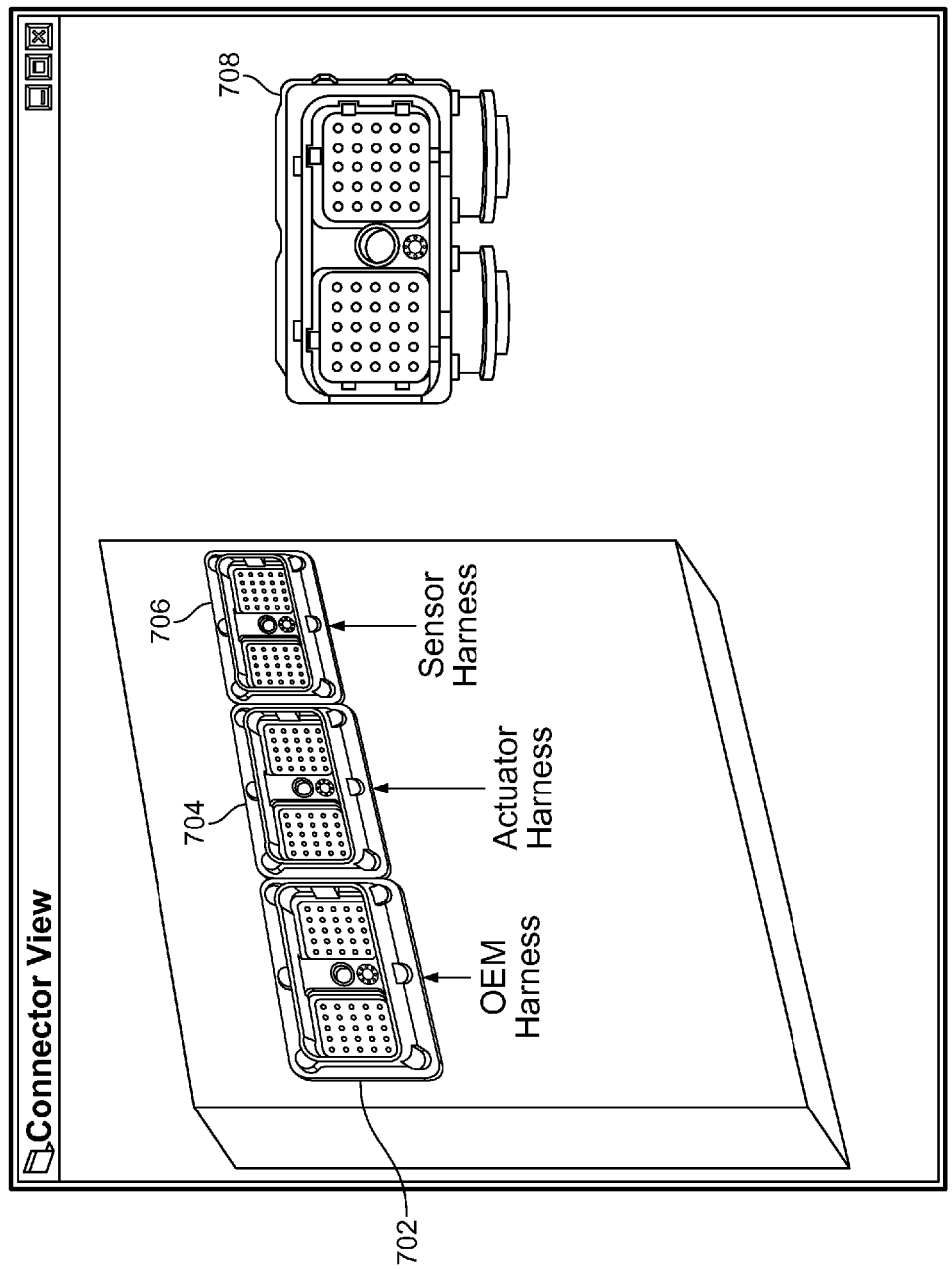
FIG. 10 is an example of a display of Connector View tagged diagnosis information displayed to a repair technician.

An example of a display of a Connector Views is set forth in FIG. 10. As shown in this figure, the Connector View sets forth several connectors involved in the repair or replacement of the coolant temperature sensor 602, including a schematic view of the OEM Harness 702, a schematic view of the Actuator Harness 704, a schematic view of the Sensor Harness 706, and finally a photograph of an actual harness 708 for ease of identification.

Figure 11:
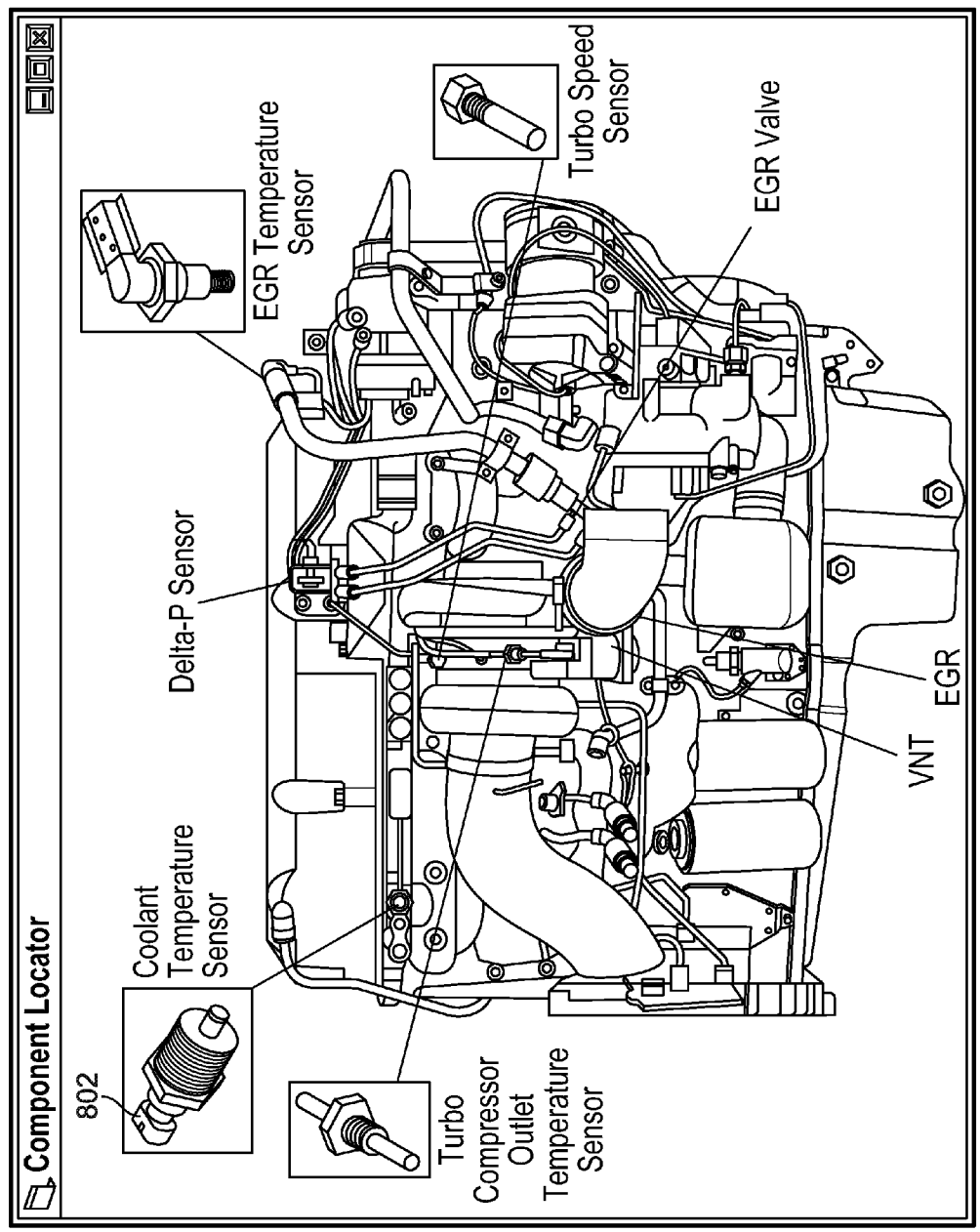
FIG. 11 is an example of a display of Component Locator tagged diagnosis information displayed to a repair technician.

An example of a display of a Component Locator is set forth in FIG. 11. As shown in this figure, the Component Locator display sets forth a general area surrounding the placement of the part to be replaced (here again, the coolant temperature sensor 802). The Component Locator display of FIG. 10 allows the repair technician to view a portrayal of an entire piece of equipment (here, an actual engine) with annotated locations of parts, making it very easy for the repair technician to locate the part needing to be repaired or replaced on the equipment.

Figure 12:
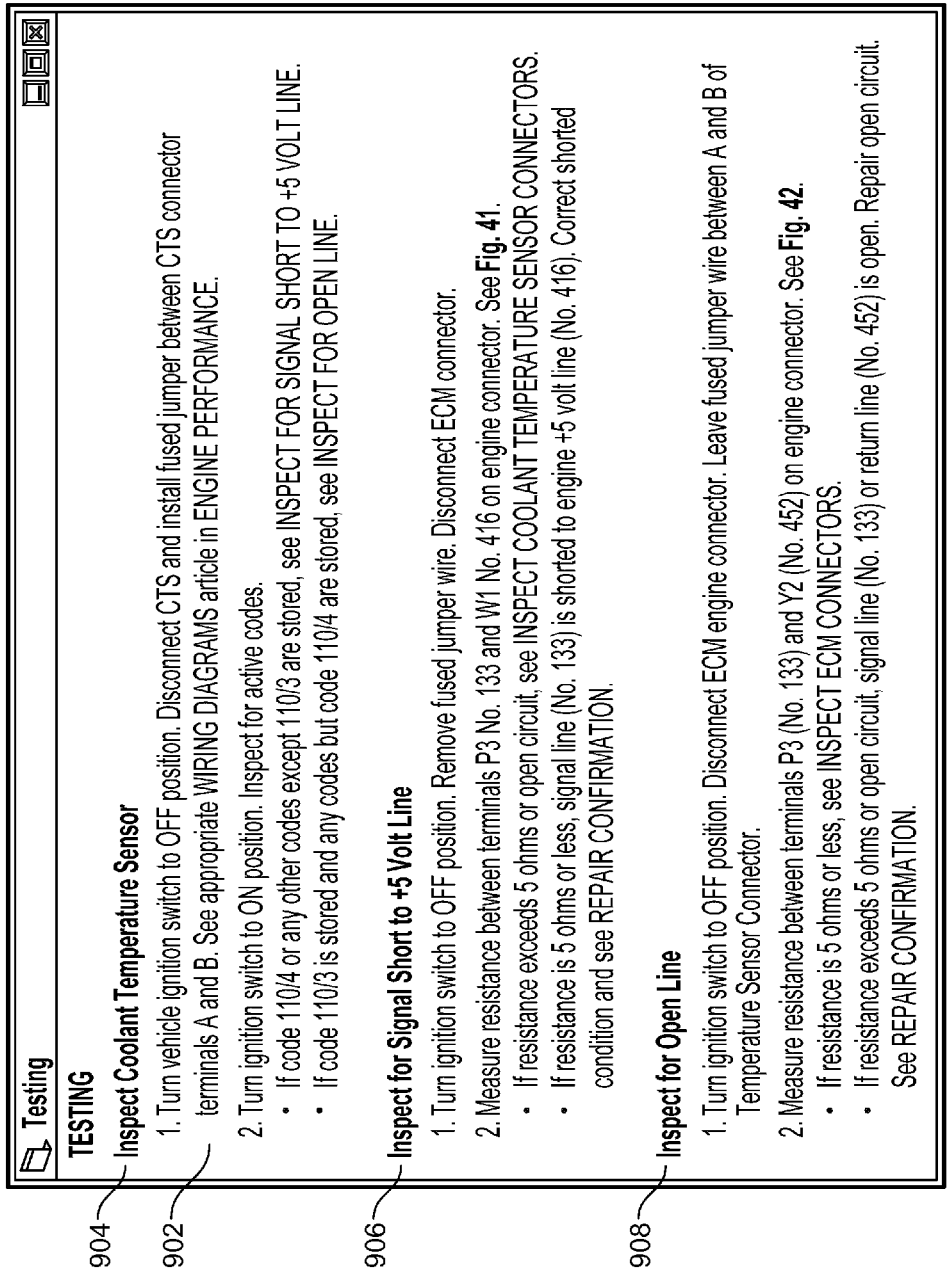
FIG. 12 is an example of a display of Testing Steps tagged diagnosis information displayed to a repair technician.

An example of a display of a Testing Steps is set forth in FIG. 12. As shown in this figure, the Testing Steps display sets forth an interlinked diagnostic tree 902 for conducting further testing to determine the culprit behind the trouble code entered by the repair technician. The diagnostic tree has interrelated steps 904, 906, 908 that include specific instructions and/or indicate equipment to be used by technicians for diagnosing vehicle problems, for example. The result of one test may infer that the problem lies in another area. For example, in the "Inspect Coolant Temperature Sensor" step 904, the result of sub-step '2' may indicate that the repair technician should begin the "Inspect For Signal Short to +5 Volt Line" step 906, or the "Inspect for Open Line" step 908. The Testing Steps display of FIG. 12 is exemplary in nature, and alternatively, a progression of question and answer windows, for example, could be used instead.

Figure 13:
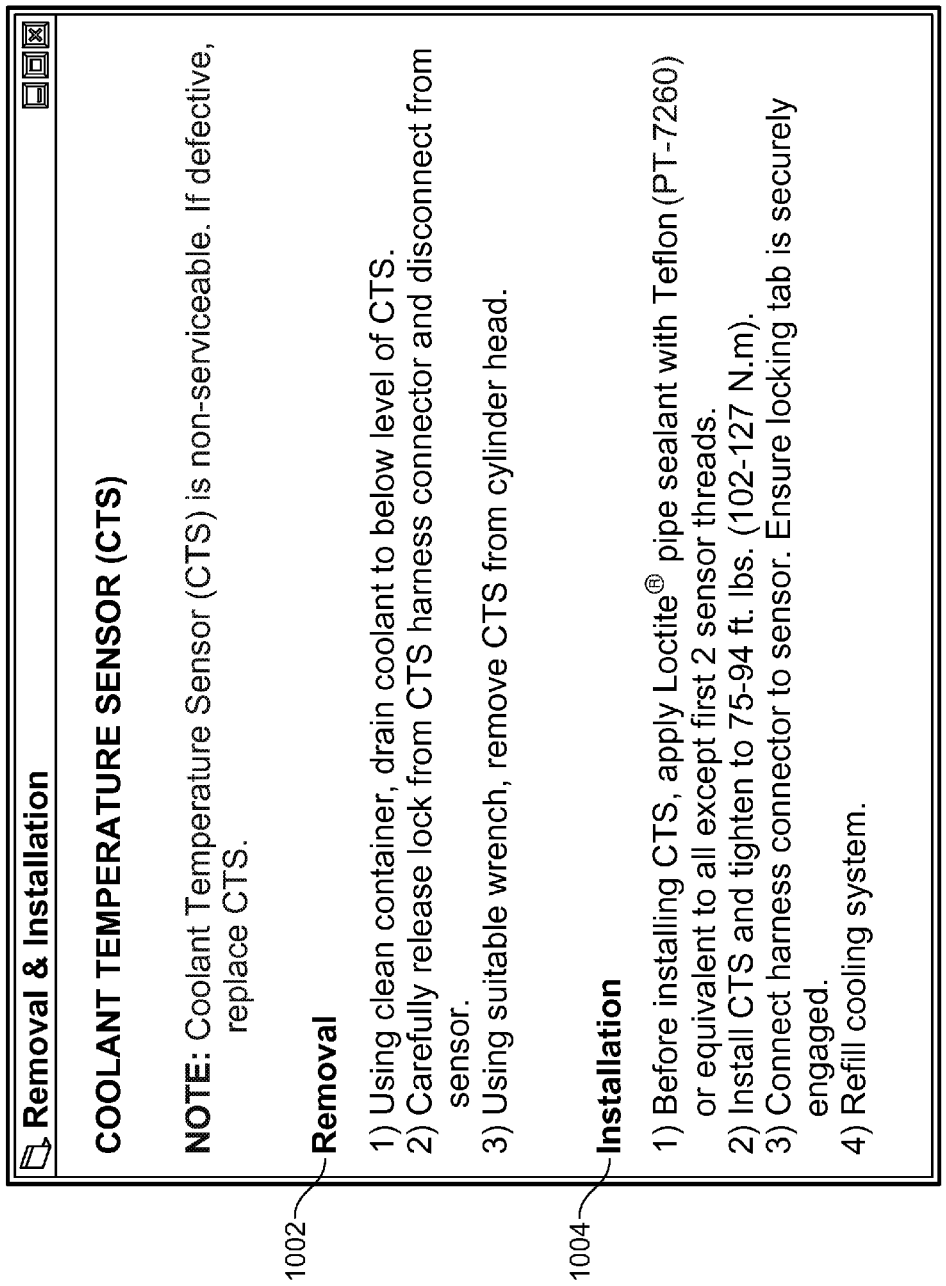
FIG. 13 is an example of a display of Removal & Installation tagged diagnosis information displayed to a repair technician.

An example of a display of a Removal and Installation is set forth in FIG. 13. As shown in this figure, the Removal and Installation display sets forth Removal Steps 1002 for removing an old part and Installation Steps 1004 for installing the new part.

An example of a display of a Specification is set forth in FIG. 14. As shown in this figure, the Specification display sets forth the particular device specifications of the part to be installed. In this case, the Specifications display provides electrical supply voltage specifications 1104, sealant specifications 1106 for choosing a proper sealant, and torque specifications 1108 setting forth maximum torque to be used when installing a part.

While each of the displays noted above included a definite structure and flow, any other structure or flow could be used and still fall within the bounds of the current invention.

Utilizing the disclosed diagnostic tool 100, a repair technician can retrieve all relevant diagnostic and repair information corresponding to received trouble codes 300 from a vehicle under diagnosis 104 can be retrieved in a short period of time and displayed on a diagnostic tool 100 in index form. By providing tagged repair information data 202, 212, 220 at the diagnostic information portal 114, a diagnostic tool can retrieve all relevant repair information quickly and at one time, caching the information locally and allowing for a quicker diagnosis and repair of the vehicle under test 104. As a result, repair stations can become more efficient, increasing turn-around times and potentially increasing profits for both the repair technician and the owner of the vehicle under test. Additionally, in the event the diagnostic information portal 114 becomes unavailable, a local cached copy of the repair information can prevent the loss of further downtime in repairing the vehicle under test 104 because of a lack of access to diagnostic repair information. Finally, by tagging diagnostic repair information 202, 212, 220 based on trouble codes 300 received from a vehicle under test 104, the load on the diagnostic information portal 114 can be substantially decreased, as only relevant information is provided to the diagnostic tool 100, and no irrelevant data is required to be served by the diagnostic information portal 114 while the repair technician finds the answer he or she is looking for.

Note that while examples have been described in conjunction with present embodiments of the application, persons of skill in the art will appreciate that variations may be made without departure from the scope and spirit of the application. For example, the apparatus and methods described herein may be implemented in hardware, software, or a combination thereof, such as a general purpose or dedicated processor running a software application through volatile or non-volatile memory in order to transform the general purpose computer or dedicated processor into a unique special purpose processor. The true scope and spirit of the application is defined by the appended claims, which may be interpreted in light of the foregoing.

What is claimed is:

1. A system for retrieving specific diagnostic information comprising:
a first computing system at a first location, the first computing system including an electronic library of diagnostic information tagged with trouble code identification ID's stored in a first electronic medium;
a second computing system at a second location, the second computing system including a first interface for retrieving one or more diagnostic trouble codes from a second electronic storage medium within a motor vehicle under diagnosis, the second computing system also having a third electronic storage medium, and having a second interface for connecting with the first computing system and having a display for displaying an index to specific diagnostic information received from the first computing system,
wherein the second computing system is configured to, after retrieval of a first diagnostic trouble code (DTC) from the motor vehicle, request, from the electronic library at the first location, specific diagnostic information tagged with a trouble code identification ID corresponding to the first DTC, receive the specific diagnostic information requested from the first computing system, store the received specific diagnostic information in third electronic storage medium, and populate the display of the second computing system with an index to the specific diagnostic information tagged with the trouble code identification ID corresponding to the first DTC stored in the third electronic storage medium of the second computing system, wherein the index to the specific diagnostic information populating the display includes at least a first button selectable to display first specific diagnostic information tagged with the trouble code identification ID corresponding to the first DTC, and a second button selectable to display second specific diagnostic information tagged with the trouble code identification ID corresponding to the first DTC, and wherein the second specific diagnostic information is different than the first specific diagnostic information.

2. The system set forth in claim 1, wherein the specific diagnostic information tagged with the trouble code identification ID corresponding to the first DTC includes at least one selected from the group consisting of wiring diagrams, images of vehicle components, suggested diagnostic testing steps, vehicle component removal and installation instructions, and component specification data.

3. The system of claim 2, wherein the component specification data comprises data selected from the group consisting of (i) an electrical specification, (ii) a sealant specification, (iii) a torque specification, (iv) a temperature specification, (v) a pressure specification, (vi) specification data for a component being diagnosed in regard to the first DTC, (vii) specification data for a component being repaired in regard to the first DTC, (viii) specification data for components being diagnosed in regard to the first DTC, and (ix) specification data for components being repaired in regard to the first DTC.

4. The system set forth in claim 1, wherein the electronic library and the second computing device are connected to the Internet, and the second computing system requests the specific diagnostic information from the electronic library at the first location via the Internet.

5. The system set forth in claim 4, wherein the second computing device also retrieves year, make, and model information or unique vehicle equipment identification number (VIN) information from the second electronic storage medium within the motor vehicle under diagnosis, and sends the year, make, and model information or VIN information along with the retrieved trouble codes to the electronic library at the first location.

6. A diagnostic system for retrieving and storing specific diagnostic information, the diagnostic system comprising:
 a computing device at a first location having a first electronic storage medium;
 a first interface, connected to the computing device, for retrieving one or more diagnostic trouble codes from a second electronic storage medium within a motor vehicle under diagnosis; and
 a second interface for connecting the computing device with a remote computing system at a second location via a network connection,
 wherein the computing device includes a display configured to display an index to specific diagnostic information received from the remote computing system,
 wherein the computing device is configured to, after retrieval of a first diagnostic trouble code (DTC) from the motor vehicle, request, from an electronic library at the remote computing system, specific diagnostic information tagged with a trouble code identification ID corresponding to the first DTC, receive the specific diagnostic information requested from the remote computing system, store the received specific diagnostic information in the first electronic storage medium, and populate the display of the computing device with an index to the specific diagnostic information tagged with the trouble code identification ID corresponding to the first DTC stored in the first electronic storage medium of the computing device, wherein the index to the specific diagnostic information populating the display includes at least a first button selectable to display first specific diagnostic information tagged with the trouble code identification ID corresponding to the first DTC, and a second button selectable to display second specific diagnostic information tagged with the trouble code identification ID corresponding to the first DTC, and wherein the second specific diagnostic information is different than the first specific diagnostic information.

7. The diagnostic system set forth in claim 6, wherein the specific diagnostic information tagged with the trouble code identification ID corresponding to the first diagnostic trouble code includes at least one selected from the group consisting of wiring diagrams, images of vehicle components, suggested diagnostic testing steps, vehicle component removal and installation instructions, and component specification data.

8. The diagnostic system of claim 7, wherein the component specification data comprises data selected from the group consisting of (i) an electrical specification, (ii) a sealant specification, (iii) a torque specification, (iv) a temperature specification, (v) a pressure specification, (vi) specification data for a component being diagnosed in regard to the first DTC, (vii) specification data for a component being repaired in regard to the first DTC, (viii) specification data for components being diagnosed in regard to the first DTC, and (ix) specification data for components being repaired in regard to the first DTC.

9. The diagnostic system set forth in claim 6, wherein the computing device and the remote computing system are connected to the Internet.

10. The diagnostic system set forth in claim 9, wherein the computing device also retrieves year, make, and model information or unique vehicle identification number (VIN) information from the second electronic storage medium within the motor vehicle under diagnosis, and sends the year, make, and model information or VIN information along with the retrieved trouble codes to the electronic library at the second location.

11. The diagnostic system of claim 6, wherein the computing device and the first interface connect with each other using a wired connection or a wireless connection.

12. A computer program product, comprising a computer readable medium having a computer readable program code embodied therein, said computer readable program code adapted to be executed by a processor to implement a method for retrieving specific diagnostic information, said method comprising:
 retrieving one or more diagnostic trouble codes from a motor vehicle under diagnosis;
 requesting, from a remote electronic library containing a library of diagnostic information tagged with trouble code identification IDs, specific diagnostic information corresponding to a first diagnostic trouble code (DTC) retrieved from the motor vehicle;
 receiving the specific diagnostic information from the remote electronic library;
 storing the specific diagnostic information, received from the remote electronic library, in a data store local to the processor; and
 populating a display with an index to the retrieved specific diagnostic information tagged with the trouble code identification ID corresponding to the first DTC stored in the data store local to the processor, wherein the index to the specific diagnostic information populating the display includes at least a first button selectable to display first specific diagnostic information tagged with the trouble code identification ID corresponding to the first DTC, and a second button selectable to display second specific diagnostic information tagged with the trouble code identification ID corresponding to the first DTC, and wherein the second specific diagnostic information is different than the first specific diagnostic information.

13. The computer program product set forth in claim 12, wherein the specific diagnostic information tagged with the trouble code identification ID corresponding to the first diagnostic trouble code includes at least one selected from the group consisting of wiring diagrams, images of vehicle components, suggested diagnostic testing steps, vehicle component removal and installation instructions, and component specification data.

14. The computer program product of claim 13, wherein the component specification data comprises data selected from the group consisting of (i) an electrical specification, (ii) a sealant specification, (iii) a torque specification, (iv) a temperature specification, (v) a pressure specification, (vi) specification data for a component being diagnosed in regard to the first DTC, (vii) specification data for a component being repaired in regard to the first DTC, (viii) specification data for components being diagnosed in regard to the first DTC, and (ix) specification data for components being repaired in regard to the first DTC.

15. The computer program product set forth in claim 12, wherein the computing program product also retrieves year, make, and model information or unique vehicle identification number (VIN) information from the first electronic storage medium within the motor vehicle under diagnosis, and sends the year, make, and model information or VIN identification information along with the retrieved trouble codes to the remote electronic library.

16. A method comprising:
receiving, by a diagnostic tool, a first diagnostic trouble code (DTC) associated with a past or current error condition of a diagnosable equipment;
transmitting, by the diagnostic tool to a communication link, a request for information objects that correspond to the first DTC and the diagnosable equipment, wherein the transmitted request for information objects comprises data identifying the first DTC and data identifying the diagnosable equipment;
receiving, by the diagnostic tool via the communication link in response to the request for information objects, a plurality of information objects that correspond to the first DTC and the diagnosable equipment;
storing, by an electronic storage medium of the diagnostic tool, the plurality of information objects that correspond to the first DTC and the diagnosable equipment;
displaying, by a display of the diagnostic tool, an index identifying the received plurality of information objects, stored by the electronic storage medium of the diagnostic tool, that correspond to the first DTC and the diagnosable equipment; and
receiving, by the diagnostic tool, a selection of an information object identified in the displayed index and responsively displaying, via the display of the diagnostic tool, the information object selected from the displayed index and received in response to the request for information objects, wherein the index identifying the received plurality of information objects includes at least a first button selectable to display a first information object that corresponds to the first DTC and the diagnosable equipment, and a second button selectable to display a second information object that corresponds to the first DTC and the diagnosable equipment, and wherein the second information object is different than the first information object.

17. The method of claim 16, wherein displaying the index identifying the received plurality of information objects comprises displaying a code description button, a wiring diagram button, a connector views button, a component locator button, a testing steps button, a removal and installation button, and a specifications button.

18. The method of claim 17, wherein the received plurality of information objects comprises (i) a wiring diagram related to the first DTC, (ii) a graphical connector view of a connector related to the first DTC, (iii) testing steps for diagnosing the first DTC, (iv) a graphical component locator view that illustrates where a component is located, (v) instructions for removing and installing a component in diagnosing the first DTC, and (vi) component specification data.

19. The method of claim 18, wherein the component specification data comprises data selected from the group consisting of (i) an electrical specification, (ii) a sealant specification, (iii) a torque specification, (iv) a temperature specification, (v) a pressure specification, (vi) specification data for a component being diagnosed in regard to the first DTC, (vii) specification data for a component being repaired in regard to the first DTC, (viii) specification data for components being diagnosed in regard to the first DTC, and (ix) specification data for components being repaired in regard to the first DTC.

20. The method of claim 16,
wherein each of the received information objects was identified from an article tagged with an article ID associated with the diagnosable equipment and by a respective object ID that corresponds to the first DTC received from the diagnosable equipment, and
wherein each of the respective object IDs is contained within the article.

21. A diagnostic tool comprising:
a processor;
a data store storing software code executable by the processor;
a display device;
a first interface arranged for the diagnostic tool to carry out communications with a diagnosable equipment via a first wired or wireless connection; and
a second interface arranged for the diagnostic tool to carry out communications with a diagnostic portal via a second wired or wireless connection,
wherein the communications with the diagnosable equipment comprise a diagnostic trouble code (DTC) request transmitted to the first wired or wireless connection by the diagnostic tool, and data, received at the first interface, identifying a first DTC associated with a past or current error condition of the diagnosable equipment,
wherein the communications with the diagnostic portal comprise a request for information objects that correspond to the first DTC and the diagnosable equipment transmitted to the second wired or wireless connection by the diagnostic tool, and a plurality of information objects that correspond to the first DTC and the diagnosable equipment, wherein the plurality of information objects are received at the diagnostic tool from the diagnostic portal in response to the request for information objects, wherein the data store stores the plurality of information objects that correspond to the first DTC and the diagnosable equipment that are received at the diagnostic tool from the diagnostic portal, wherein the request for information objects comprises data identifying the first DTC and data identifying the diagnosable equipment, and wherein the stored software code comprises software code executed by the processor to cause the display device to display an index identifying the stored plurality of information objects that correspond to the first DTC and the diagnosable equipment, and, in response to a selection of an information object identified in the displayed index, to cause the display device to display the information object selected from the displayed index and received in response to the request for information objects, wherein the index identifying the received plurality of information objects includes at least a first button selectable to display a first information object that corresponds to the first DTC and the diagnosable equipment, and a second button selectable to display a second information object that corresponds to the first DTC and the diagnosable equipment, and wherein the second information object is different than the first information object.

22. The diagnostic tool of claim 21, wherein the received plurality of information objects comprises (i) a wiring diagram related to the first DTC, (ii) a graphical connector view of a connector related to the first DTC, (iii) testing steps for diagnosing the first DTC, (iv) a graphical component locator view that illustrates where a component is located, (v) instructions for removing and installing a component in diagnosing the first DTC, and (vi) component specification data.

23. The diagnostic tool of claim 22, wherein the specification data comprises data selected from the group consisting of (i) an electrical specification, (ii) a sealant specification, (iii) a torque specification, (iv) a temperature specification, (v) a pressure specification, (vi) specification data for a component being diagnosed in regard to the first DTC, (vii) specification data for a component being repaired in regard to the first DTC, (viii) specification data for components being diagnosed in regard to the first DTC, and (ix) specification data for components being repaired in regard to the first DTC.

24. The diagnostic tool of claim 21,
wherein the displayed index comprises a summary box configured to display a text summary regarding the first DTC, and
wherein the displayed index comprises a clear code button configured to cause a text summary being displayed in the summary box to be removed from the summary box.

* * * * *